W. HANCOX.
CLOTHES LINE PULLEY.
APPLICATION FILED JULY 19, 1912.
1,051,223.
Patented Jan. 21, 1913.
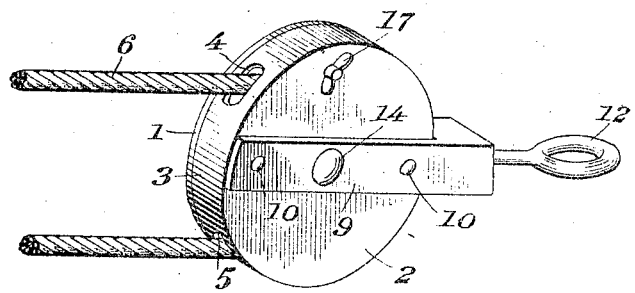
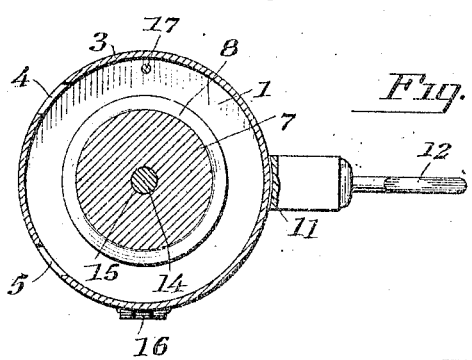
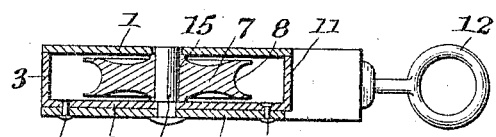
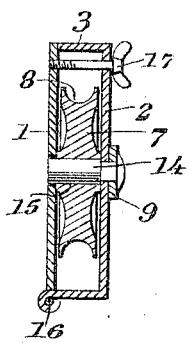
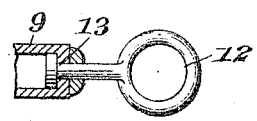
Inventor
William Hancox
By Victor J. Evans
Attorney
Witnesses
M. F. Gannett
R. M. Smith

UNITED STATES PATENT OFFICE.

WILLIAM HANCOX, OF HOBOKEN, NEW JERSEY.

CLOTHES-LINE PULLEY.

1,051,223. Specification of Letters Patent. Patented Jan. 21, 1913.

Application filed July 19, 1912. Serial No. 710,432.

*To all whom it may concern:*

Be it known that I, WILLIAM HANCOX, a citizen of the United States, residing at Hoboken, in the county of Hudson and State of New Jersey, have invented new and useful Improvements in Clothes-Line Pulleys, of which the following is a specification.

This invention relates to clothes line pulleys, the object in view being to provide a simple and practical pulley of the class described, which will exclude dirt, dust, and other foreign matter, and which will also swivel or turn to any desired angle, in order to accommodate the clothes line passing around the same.

A further object of the invention is to provide a mounting or holding bar for said pulley, so combined with the housing of the pulley as to relieve the pulley as a whole of any unusual strain.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a perspective view of the complete pulley, embodying the present invention. Fig. 2 is a sectional view through the pulley taken at right angles to the shaft. Fig. 3 is a cross section through the pulley taken in line with the holding bar. Fig. 4 is a cross section taken at right angles to Fig. 2, showing the hinge connection of one side of the housing. Fig. 5 is a detail section through the swivel joint.

The pulley contemplated in this invention embodies a housing, consisting of oppositely arranged side plates 1 and 2, between which is an annular rim 3 which is carried by the plate 2, being permanently secured thereto or formed as an integral part thereof, as may be preferred.

The rim 3 is provided at suitable points with slots or openings 4 and 5 to receive the incoming and outgoing runs of the line 6, said line passing around an interiorly arranged pulley wheel 7 having a grooved periphery, as shown at 8, to receive the line 6.

Connected to the plate 2 is a holding bar 9, the same being shown as riveted thereto, as at 10. This holding bar is recessed or cut away, as shown at 11, to receive the housing hereinabove described, while secured to the outer extremity of said holding bar is an eye 12, the same being connected to the extremity of the holding bar by a swivel joint, as shown at 13, which enables the pulley to accommodate itself to any desired angle, after the eye 12 has been engaged with the hook or like holding device on a wall, fence, building, or other support.

Extending inward from and fixedly secured to the central portion of the holding bar 9 is a pivot stud or shaft 14 which passes through a central hole 15 in the pulley, and extends sufficiently close to the opposite plate of the housing to form an efficient bearing for said pulley.

The plate 1 is connected to the rim 3, preferably at or near the bottom thereof, by means of a hinged joint, as shown at 16, which enables the housing to be opened at one side for the purpose of reeving the line through the holes 4 and 5, and around the pulley 7. After this is accomplished, the plate 1 may be closed and secured by means of a thumb screw 17 which passes through both of the side plates and is threaded into one of them, as shown in the cross sectional view.

What is claimed is:

1. A clothes line pulley, comprising a cylindrical housing embodying two side plates, a rim extending between said plates and carried by one plate and provided with holes for the line, the other plate being hinged to the rim, a holding bar extending diametrically of the rim carrying plate, a shaft fastened to said bar and extending through one plate to the other, a grooved pulley wheel journaled on said shaft, and means for fastening the plates together.

2. A clothes line pulley, comprising a cylindrical housing embodying two side plates, a rim extending between said plates and carried by one plate and provided with holes for the line, the other plate being hinged to the rim, a holding bar extending diametrically of the rim carrying plate, a shaft fastened to said bar and extending through one plate to the other, a grooved pulley wheel journaled on said shaft, means for fastening the plates together, and an attaching eye having a swiveled connection with the outer extremity of the holding bar.

In testimony whereof I affix my signature in presence of two witnesses.

WILLIAM HANCOX.

Witnesses:
   Geo. Horstman,
   Jos. H. Stearns, Jr.